June 7, 1960  J. P. LINDSEY  2,940,062
TUNING SYSTEM

Filed Feb. 6, 1956  3 Sheets-Sheet 1

INVENTOR.
J. P. LINDSEY

BY Hudson & Young

ATTORNEYS

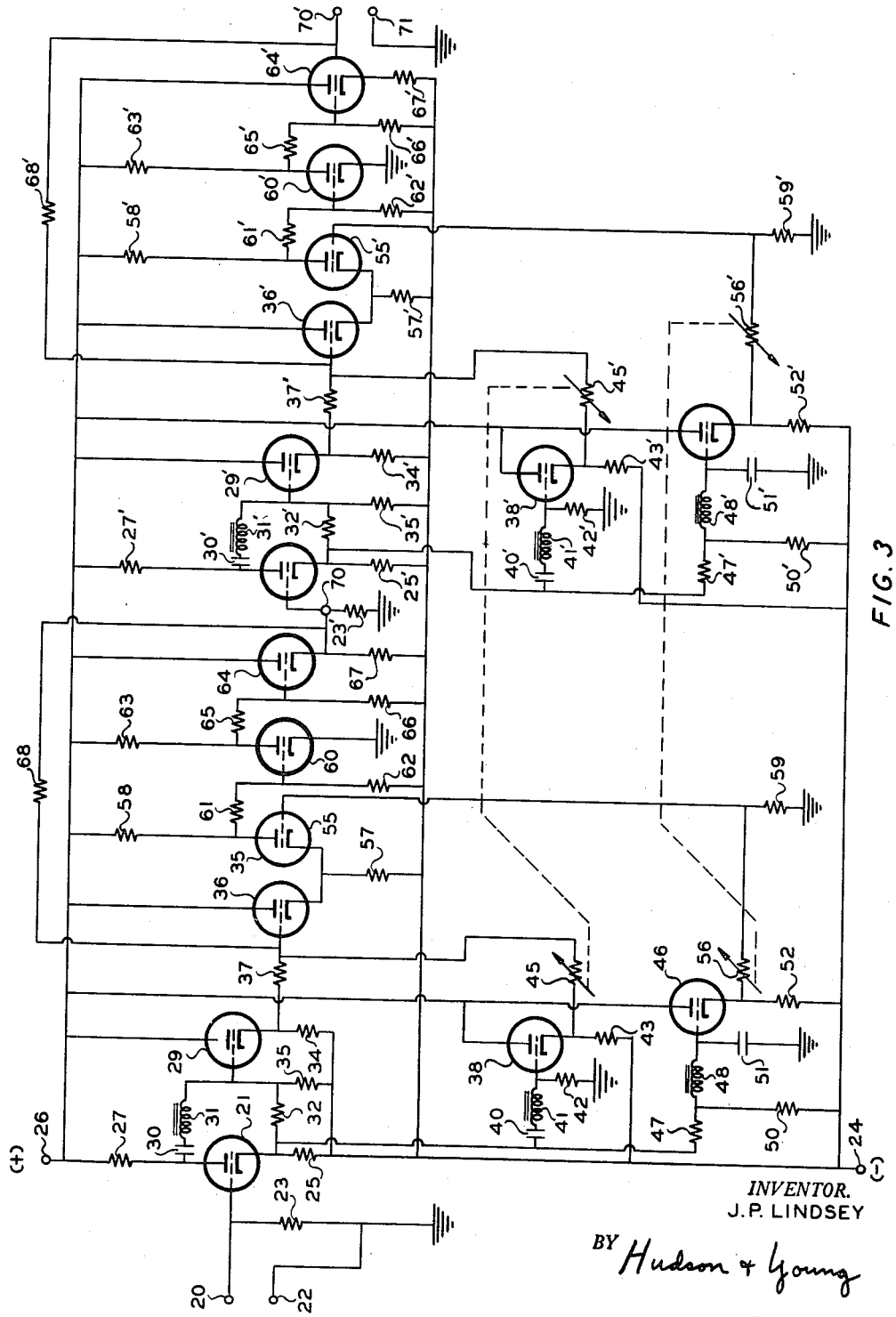

United States Patent Office 2,940,062
Patented June 7, 1960

2,940,062

TUNING SYSTEM

Joe P. Lindsey, Bartlesville, Okla., assignor to Phillips Petroleum Company, a corporation of Delaware Filed Feb. 6, 1956, Ser. No. 563,531

15 Claims. (Cl. 340—15)

This invention relates to a tuning system to recognize electrical signals in the presence of noise. In another aspect it relates to an adjustable time delay network.

In geophysical prospecting, it is common practice to obtain information regarding subterranean formations by means of seismic surveys. An explosion charge is detonated at or near the surface of the earth. Vibrations resulting from the explosion travel downwardly and are reflected back to the surface from various beds. These vibrations are detected by a plurality of seismometers spaced from the shot point. From measurements of the travel times of the reflected vibrations, valuable information can be obtained regarding the depth and dip of the reflecting beds. Unfortunately, however, it is often difficult or impossible to recognize the reflected vibrations in the recorded records because of the presence of noise vibrations. Various systems have been proposed to recognize the desired signals in the presence of this interfering noise.

The present invention is primarily concerned with providing an improved tuning system to recognize reflected seismic vibrations in the presence of noise vibrations. These noise vibrations can be expressed as a sum of damped sinusoidal components. In order to eliminate damped sinusoidal wave forms, a novel noise rejection circuit is provided which is capable of converting a damped sinusoidal input signal into a single sharp pulse output signal. The circuit is continuously variable to reject signals of frequencies in a preselected range.

In accordance with a second aspect of this invention, a tuning network is provided which is capable of recognizing a predetermined wave form by a correlation function. It is assumed that a principal form of seismic reflections is that of the second derivative of the normal density function. The tuning network provided by this invention has the response of such a wavelet if a sharp pulse is applied to the input terminals. An output signal of maximum amplitude is obtained when a wavelet of the form to which the network is tuned is applied to the input terminals. This network is continuously variable to permit tuning to wave forms of various amplitudes and frequencies.

These two circuits can be employed, either alone or together, to provide tuning systems for seismic signals.

Accordingly, it is an object of this invention to provide improved tuning systems for use with seismic exploration apparatus.

Another object is to provide a filter circuit to reject vibrations of damped sinusoidal wave forms.

Another object is to provide a signal tuning network for recognizing vibrations of predetermined wave form by a correlation function.

A further object is to provide a smoothly adjustable time delay network.

Other objects, advantages and features of this invention should become apparent from the following detailed description, taken in conjunction with the accompanying drawing in which:

Figure 3 is a schematic circuit drawing of the noise rejector of Figure 1;

Figure 1:
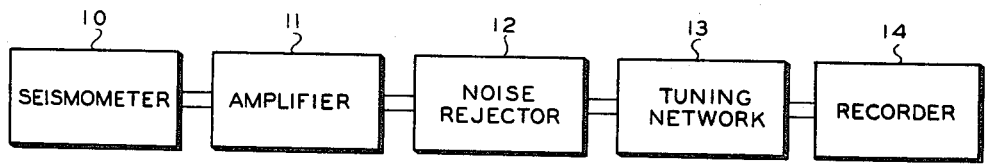
Figure 1 is a schematic representation of the seismic signal recognition system of this invention.
Figure 2:
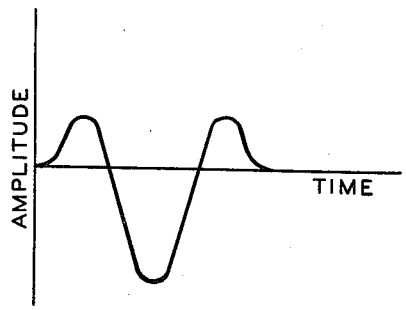
Figure 2 is a representation of a "Ricker wavelet" which is to be recognized in the seismometer output.

Referring now to the drawing in detail and to Figure 1 in particular, there is shown a schematic representation of the complete seismic tuning system of this invention. The output terminals of a seismometer 10 are connected to the input terminals of an amplifier 11. The output terminals of amplifier 11 are connected to the input terminals of a noise rejector circuit 12. As previously mentioned, a large portion of the extraneous noise vibrations received by the seismometer are of the form of damped sinusoidal waves. When such a signal is applied to the input terminals of noise rejector 12, the output signal comprises a single sharp pulse. Such a signal is transmitted to the input of a tuning network 13. It is generally believed that seismic reflections in the absence of noise have a wave form of the general configuration shown in Figure 2. This wavelet represents the second derivative of the normal density function $y = Ke^{-a^2t^2}$, where $y$ is the amplitude, $K$ and $a$ are constants, $e$ is the base of natural logarithms, and $t$ is time. Network 13 is adapted to recognize such a wave form by a correlation function. This network is tuned so that an output signal of the form illustrated in Figure 2 is provided if a single sharp pulse is applied to the input terminals. If a wave form of the configuration of Figure 2 arrives at the input terminals of network 13, the output signal exhibits a maximum to indicate the presence of this wave form. This recognition is one of correlation. The output terminals of network 13 are connected to the input terminals of a recorder 14.

The circuit of noise rejector 12 is illustrated in detail in Figure 3. The first input terminal 20 is connected to the control grid of a triode 21. The second input terminal 22 is connected to ground. The control grid of triode 21 is connected to ground through a resistor 23. The cathode of triode 21 is connected to a negative potential terminal 24 through a resistor 25. The anode of triode 21 is connected to a positive potential terminal 26 through a resistor 27. The anode of triode 21 is also connected to the control grid of a second triode 29 through a capacitor 30 and an inductor 31 which are connected in series relationship. The cathode of triode 21 is connected to the control grid of triode 29 through a resistor 32. The cathode and control grid of triode 29 are connected to terminal 24 through respective resistors 34 and 35. The anode of triode 29 is connected to terminal 26. The cathode of triode 29 is connected to the control grid of a triode 36 through a resistor 37.

The cathode of triode 21 is also connected to the control grid of a triode 38 through a capacitor 40 and an inductor 41 which are connected in series relationship. The control grid of triode 38 is connected to ground through a resistor 42. The cathode of triode 38 is connected to terminal 24 through a resistor 43. The anode of triode 38 is connected to terminal 26. The cathode of triode 38 is connected to the control grid of triode 36 through a variable resistor 45.

The cathode of triode 21 is also connected to the control grid of a triode 46 through a resistor 47 and an inductor 48 which are connected in series relationship. The junction between resistor 47 and inductor 48 is connected to terminal 24 through a resistor 50. The control grid of triode 46 is connected to ground through a capacitor 51. The cathode of triode 46 is connected to terminal 24 through a resistor 52. The anode of triode 46 is connected to terminal 26. The cathode of triode 46 is connected to the control grid of a triode 55 through a variable resistor 56.

The cathodes of triodes 36 and 55 are connected to terminal 24 through a common resistor 57. The anode of triode 36 is connected to terminal 26, and the anode of triode 55 is connected to terminal 26 through a resistor 58. The anode of triode 55 is also connected to the control grid of a triode 60 through a resistor 61. The control grid of triode 60 is connected to terminal 24 through a resistor 62. The cathode of triode 60 is connected to ground, and the anode of triode 60 is connected to terminal 26 through a resistor 63. The anode of triode 60 is also connected to the control grid of a triode 64 through a resistor 65. The control grid of triode 64 is connected to terminal 24 through a resistor 66. The anode of triode 64 is connected to terminal 26, and the cathode of triode 64 is connected to terminal 24 through a resistor 67. The cathode of triode 64 is connected to a terminal 70. The cathode of triode 64 is also connected through a feedback resistor 68 to the control grid of triode 36.

The circuit thus far described comprises the first stage of noise rejector circuit 12. The second stage is identical to the first stage and corresponding elements are designated by like primed reference numerals. Resistors 45 and 45' are mechanically connected to one another so that an increase in the value of one resistor results in a corresponding decrease in the value of the other. Resistors 56 and 56' are similarly connected to one another. The output terminals of the second stage of the noise rejector circuit are indicated by numerals 70' and 71, the latter being grounded.

The rejector circuit of Figure 3 converts damped sinusoidal wave forms into single sharp pulses. It can be shown mathematically that if a signal $S(s)$ is present with noise $N(s)$ so that the total information is $$S(s)+N(s)$$

the optimum linear tuning for improvement of the signal to noise ratio is $$\frac{S^*(s)}{N(s)N^*(s)} \quad (1)$$

where $S^*(s)$ and $N^*(s)$ are the Laplace transform expressions for signal and noise, respectively, with the real components having their signs changed. The circuit of Figure 3 provides the term $$\frac{1}{N(s)N^*(s)}$$

for signals of damped sinusoidal form. A damped sinusoidal wave is represented by the expression $$f(t)=e^{-\alpha t} \sin \omega t \quad (2)$$

where $t$ is time, $e$ is the base of natural logarithms, $\omega$ is frequency and $\alpha$ is an amplitude damping constant. The Laplace transformation $F(s)$ of this expression is $$F(s)=\frac{1}{s^2+2\alpha s+\omega^2} \quad (3)$$

where $s$ is the complex frequency variable associated with Laplace transform theory.

The first stage of the circuit of Figure 3 comprises an "all pass," a "band pass" and a "low pass" network. The output of the "all pass" network is added to the output of the "band pass" network and the output of the lower "low pass" network is subtracted therefrom. The signal from amplifier 11 of Figure 1 is transmitted through cathode follower 21. The output of cathode follower 21 is applied through cathode follower 29 to triode 36. A portion of the output of cathode follower 21 is applied through the "band pass" network formed by capacitor 40 and inductor 41 and through cathode follower 38 to the triode 36. These two signals are added at the grid of triode 36. A third portion of the output of cathode follower 21 is applied through the "low pass" filter network formed by inductor 48 and capacitor 51 and through cathode follower 46 to the control grid of triode 55. Because the two cathodes of triodes 36 and 55 are connected, the signal applied to the control grid of triode 55 is in effect subtracted from the two signals which are added at the grid of triode 36. The output of triode 55 is amplified by triodes 55, 60 and 64. Feedback resistor 68 reduces the gain of the amplifier circuit to provide an operational amplifier of minimum distortion.

The second stage of the circuit of Figure 3 is identical to the first stage. Ganged resistors 45 and 45' permit the network to be tuned to reject signals having different damping rates. Ganged resistors 56 and 56' permit the network to be tuned to reject signals of different frequencies. These ganged resistors make the network smoothly adjustable to reject damped sinusoidal signals of various frequencies and decay characteristics.

In most seismic work the highest frequency of interest is generally not greater than approximately 100 cycles per second. In the illustrated noise rejector network the products of the inductance and capacitance of the filter networks are all equal. Thus, the products of the values of 30, 31; 40, 41; 48, 51; 30', 31'; 40', 41'; and 48', 51' are all equal. If 100 cycles per second ($200\pi$) is the highest frequency of interest, $$\frac{1}{LC}=(200\pi)^2$$

for each of the networks, where L and C are the values of the corresponding inductors and capacitors. As a practical matter it is desired that all of the inductances be equal and that $$\frac{R}{L}=0.707\ (200\pi)^2$$

for each of the filter networks.

Figure 4:
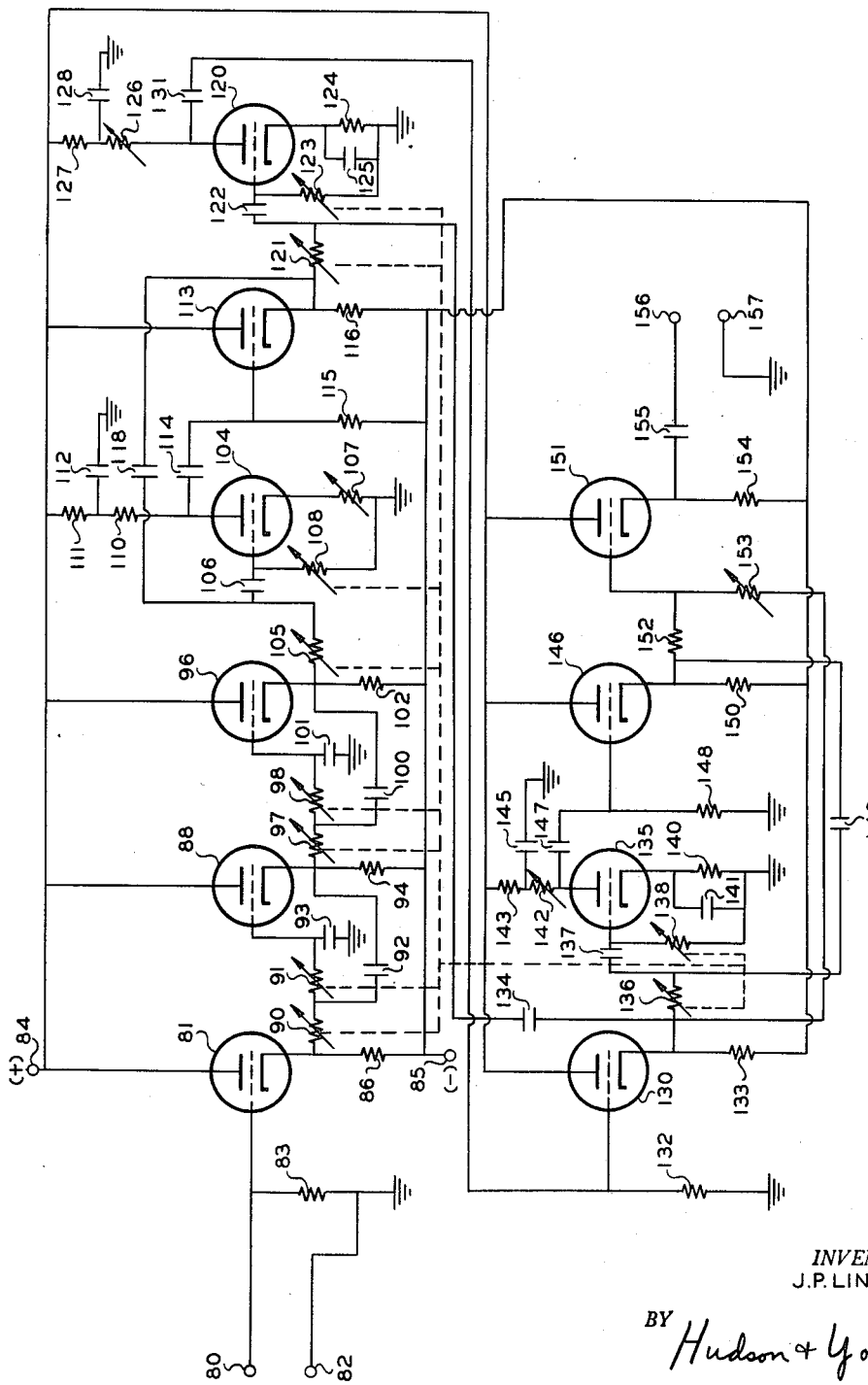
Figure 4 is a schematic circuit drawing of the tuning network of Figure 1.

Tuning network 13 is illustrated in detail in Figure 4. The first input terminal 80 is connected to the control grid of a triode 81. The second input terminal 82 is connected to ground. The control grid of triode 81 is connected to ground through a resistor 83. The anode of triode 81 is connected to a positive potential terminal 84, and the cathode of triode 81 is connected to a negative potential terminal 85 through a resistor 86. The cathode of triode 81 is also connected to the control grid of a triode 88 through series connected variable resistors 90 and 91. The junction between resistors 90 and 91 is connected to the cathode of triode 88 through a capacitor 92. The control grid of triode 88 is connected to ground through a capacitor 93. The anode of triode 88 is connected to terminal 84, and the cathode of triode 88 is connected to terminal 85 through a resistor 94. The cathode of triode 88 is connected to the control grid of a triode 96 through series connected resistors 97 and 98. The junction between resistors 97 and 98 is connected to the cathode of triode 96 through a capacitor 100. The control grid of triode 96 is connected to ground through a capacitor 101. The anode of triode 96 is connected to terminal 84, and the cathode of triode 96 is connected to terminal 85 through a resistor 102.

The cathode of triode 96 is connected to the control grid of a triode 104 through a variable resistor 105 and a capacitor 106 which are connected in series relationship. The cathode and the control grid of triode 104 are connected to ground through respective variable resistors 107 and 108. The anode of triode 104 is connected to terminal 84 through series connected resistors 110 and 111. The junction between these resistors is connected to ground through a capacitor 112. The anode of triode 104 is also connected to the control grid of a triode 113 through a capacitor 114. The control grid of triode 113 is connected to terminal 85 through a resistor 115. The anode of triode 113 is connected to terminal 84, and the cathode of triode 113 is connected to terminal 85 through a resistor 116. The cathode of triode 113 is also connected through a capacitor 118 to the junction between resistor 105 and capacitor 106.

The cathode of triode 113 is connected to the control grid of a triode 120 through a variable resistor 121 and a capacitor 122 which are connected in series relationship. The control grid of triode 120 is connected to ground through a variable resistor 123. The cathode of triode 120 is connected to ground through a resistor 124 which is shunted by a capacitor 125. The anode of triode 120 is connected to terminal 84 through a variable resistor 126 and a resistor 127 which are connected in series relationship. The junction between these resistors is connected to ground through a capacitor 128. The anode of triode 120 is also connected to the control grid of a triode 130 through a capacitor 131. The control grid of triode 130 is connected to ground through a resistor 132. The anode of triode 130 is connected to terminal 84, and the cathode of triode 130 is connected to terminal 85 through a resistor 133. The cathode of triode 130 is connected through a capacitor 134 to the junction between resistor 121 and capacitor 122.

The cathode of triode 130 is also connected to the control grid of a triode 135 through a variable resistor 136 and a capacitor 137 which are connected in series relationship. The control grid of triode 135 is connected to ground through a variable resistor 138. The cathode of triode 135 is connected to ground through a resistor 140 which is shunted by a capacitor 141. The anode of triode 135 is connected to terminal 84 through a variable resistor 142 and a resistor 143 which are connected in series relationship. The junction between these resistors is connected to ground through a capacitor 145. The anode of triode 135 is also connected to the control grid of a triode 146 through a capacitor 147. The control grid of triode 146 is connected to ground through a resistor 148. The anode of triode 146 is connected to terminal 84, and the cathode of triode 146 is connected to terminal 85 through a resistor 150. The cathode of triode 146 is also connected to the control grid of a triode 151 through a resistor 152. A variable resistor 153 is connected between the cathode of triode 130 and the control grid of triode 151. The anode of triode 151 is connected to terminal 84, and the cathode of triode 151 is connected to terminal 85 through a resistor 154. The cathode of triode 151 is also connected through a capacitor 155 to a first output terminal 156. The second output terminal 157 is connected to ground.

Resistors 90, 91, 97, 98, 105, 108, 121, 123, 136 and 138 are ganged to one another so that the values of these resistors can be increased or decreased together.

The network of Figure 4 provides the $S^*(s)$ term in Expression 1 for a wave of the general configuration shown in Figure 2. It has been discovered that the Laplace transformation $F(s)$ of a network required to give a response of the form shown in Figure 2 when energized by a sharp input pulse is $$F(s) = \frac{s^2(s^2-2\alpha s+\alpha^2+100\beta^2)}{(s^2+2\alpha s+\alpha^2+\beta^2)(s^2+2\alpha s+\alpha^2+9\beta^2)(s^2+2\alpha s+\alpha^2+25\beta^2)(s^2+2\alpha s+\alpha^2+100\beta^2)}$$

where $$\frac{\alpha}{\beta} = \frac{5}{2}$$

$s$ is the complex frequency variable associated with Laplace transform theory, $\alpha$ is the real part of the complex frequency, and $\beta$ is the imaginary part of the complex frequency. The first two filter sections of the network of Figure 4 are RC active, low pass sections, having two poles in the Laplace transform notation. The following two sections are low pass having two poles and a zero each. The last section is an all pass network having two poles and two zeros. The sections are separated by a vacuum tube to provide isolation and any desired amplification.

The network of Figure 4 is smoothly adjustable to tune for wavelets of different frequencies by varying the ganged resistors. In one specific embodiment of this invention the following circuit components were employed (all resistances being expressed in ohms and all capacitances in microfarads):

| Component: | Value |
|---|---|
| 90 | 333,300 |
| 91 | 333,300 |
| 97 | 333,300 |
| 98 | 333,300 |
| 105 | 667,000 |
| 108 | 667,000 |
| 121 | 667,000 |
| 123 | 667,000 |
| 136 | 133,000 |
| 138 | 133,000 |
| 83 | 500,000 |
| 86 | 6,000 |
| 94 | 6,000 |
| 102 | 6,000 |
| 107 | 1,500 |
| 110 | 16,000 |
| 111 | 2,000 |
| 115 | 2,000,000 |
| 116 | 6,000 |
| 114 | 0.47 |
| 122 | 0.00192 |
| 128 | 50 |
| 134 | 0.00153 |
| 141 | 50 |
| 147 | 0.47 |
| 149 | 0.0062 |
| 124 | 820 |
| 126 | 25,000 |
| 127 | 2,000 |
| 132 | 2,000,000 |
| 133 | 6,000 |
| 140 | 7,000 |
| 142 | 50,000 |
| 143 | 2,000 |
| 148 | 2,000,000 |
| 150 | 6,000 |
| 152 | 4,000,000 |
| 153 | 1,250,000 |
| 154 | 6,000 |
| 92 | 0.0498 |
| 93 | 0.0351 |
| 100 | 0.0572 |
| 101 | 0.01365 |
| 106 | 0.00289 |
| 112 | 50 |
| 118 | 0.00304 |
| 125 | 50 |
| 131 | 0.47 |
| 137 | 0.00344 |
| 145 | 50 |
| 155 | 0.05 |

The stated values for the variable resistors represent maximum resistances. The ten triodes were each one-half of a tube type 6201. Terminal 84 was maintained at +150 volts and terminal 85 was maintained at −12 volts. The network having these values is smoothly adjustable to accommodate frequencies in the range of approximately 20 to 80 cycles per second.

Figure 5:
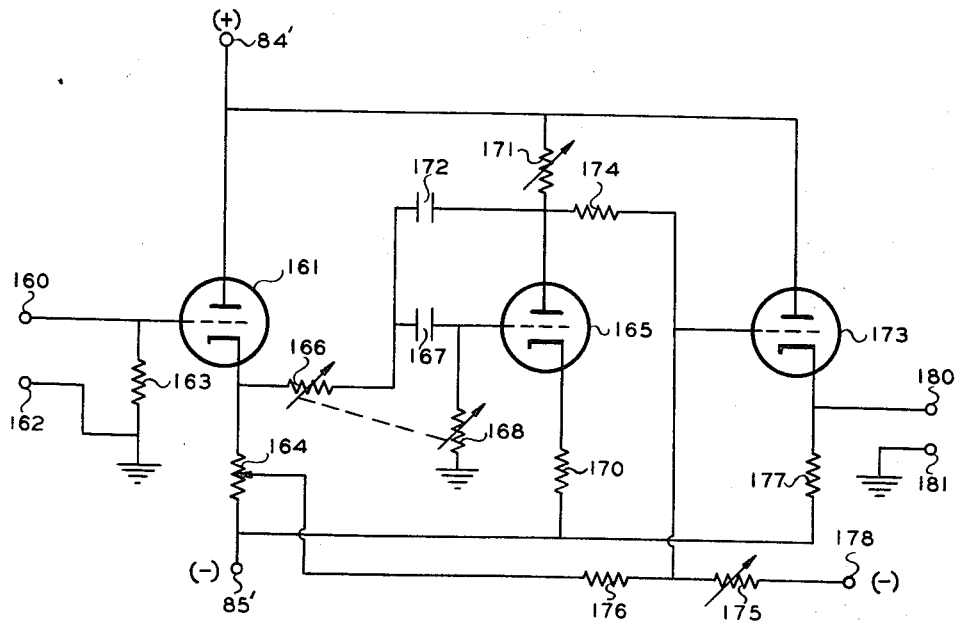
Figure 5 is a modified form of time delay network which can be employed in the network of Figure 4.

The circuit of Figure 4 between the cathode of triode 130 and the control grid of triode 151 can be considered as a time delay network. The circuit of Figure 5 represents a modified form of such a network which can be employed in Figure 4. Such a delay network is also of general utility in computing operations. The first input terminal 160 of Figure 5 is connected to the control grid of a triode 161. The second input terminal 162 is connected to ground. The control grid of triode 161 is connected to ground through a resistor 163. The anode of triode 161 is connected to a positive potential terminal 84', and the cathode of triode 161 is connected to a negative potential terminal 85' through a potentiometer 164. The cathode of triode 161 is connected to the control grid of a triode 165 through a variable resistor 166 and a capacitor 167 which are connected in series relationship. The control grid of triode 165 is connected to ground through a variable resistor 168 which is mechanically coupled to resistor 166 so that both can be increased or decreased together. The cathode of triode 165 is connected to terminal 85' through a resistor 170, and the anode of triode 165 is connected to terminal 84' through a variable resistor 171. A capacitor 172 is connected between the anode of triode 165 and the junction between resistor 166 and capacitor 167. The anode of triode 165 is connected to the control grid of triode 173 through a resistor 174. The control grid of triode 173 is connected to a negative potential terminal 178 through a variable resistor 175. A resistor 176 is connected between the contactor of potentiometer 164 and the control grid of triode 173. The anode of triode 173 is connected to terminal 84', and the cathode of triode 173 is connected to terminal 85' through a resistor 177. The cathode of triode 173 is connected to a first output terminal 180. The second output terminal 181 is connected to ground.

In one specific embodiment of the network of Figure 5, the following circuit components were employed (all resistances are in ohms and all capacitances are in microfarads):

| Component: | Value |
|---|---|
| 163 | 470,000 |
| 164 | 10,000 |
| 166 | 111,000 |
| 168 | 100,000 |
| 170 | 5,600 |
| 171 | 25,000 |
| 174 | 500,000 |
| 175 | 650,000 |
| 176 | 500,000 |
| 177 | 5,600 |
| 167 | 0.0068 |
| 172 | 0.0045 |

The potentials at terminals 84', 85' and 178 were +150 volts, −12 volts and −90 volts, respectively. The three triodes were each one-half of a tube type 6201. This particular network has been found capable of delaying all frequencies up to approximately 100 cycles per second by equal amounts without distortion. The amount of delay can be varied between about 0.4 and 4 milliseconds by adjustment of ganged resistors 166 and 168.

From the foregoing description of present preferred embodiments of this invention, it should be apparent that improved apparatus is provided for use in the interpretation of seismic signals. The noise rejector and tuning networks can be employed together or separately, depending upon the type of recorded records which are desired. Either circuit can be connected to the output of amplifier 11. While the invention has been described in conjunction with present preferred embodiments, it should be evident that it is not limited thereto.

What is claimed is:

1. A tuning system for data processing comprising means for providing electrical signals representative of mechanical vibrations; a noise rejector circuit means, having input terminals connected to said means for providing, and having output terminals, for producing a single output pulse at said output terminals in response to the application to said input terminals of a signal having a wave form represented by the expression $$e^{-\alpha t} \sine \omega t$$

where $t$ is time, $e$ is the base of natural logarithms, $\omega$ is frequency and $\alpha$ is an amplitude damping constant; a tuning network means, connected in series to the output terminals of said noise rejector circuit means, for responding to one of said output pulses by producing a wave form represented by the Laplace transformation $$\frac{s^2(s^2 - 2\alpha s + \alpha^2 + 100\beta^2)}{(s^2 + 2\alpha s + \alpha^2 + \beta^2)(s^2 + 2\alpha s + \alpha^2 + 9\beta^2)(s^2 + 2\alpha s + \alpha^2 + 25\beta^2)(s^2 + 2\alpha s + \alpha^2 + 100\beta^2)}$$

where $$\frac{\alpha}{\beta} = \frac{5}{2}$$

$s$ is the complex frequency variable associated with Laplace transform theory, $\alpha$ is the real part of the complex frequency and $\beta$ is the imaginary part of the complex frequency; and output terminals at which said Laplace transformation wave form appears.

2. Apparatus according to claim 1 further comprising means for recording said Laplace transformation wave form, said means for recording being connected to the last-said output terminals.

3. Apparatus according to claim 1 wherein said means for providing comprises a seismometer.

4. The combination in accordance with claim 1 wherein said tuning network means comprises first and second resistance-capacitance active low pass filter sections each having two poles in the Laplace transform notation, third and fourth resistance-capacitance active low pass filter sections having two poles and a zero each, a fifth resistance-capacitance all pass filter section having two poles and two zeros, and circuit means connecting all of said sections in series relationship.

5. The combination in accordance with claim 1 wherein said rejector circuit means comprises first and second networks, each of said networks comprising a first tube having an anode, a cathode and a control grid, a first input terminal connected to the control grid of said first tube, a second input terminal connected to a reference potential, a first filter comprising a first capacitor and a first inductor connected in series, one terminal of said first filter being connected to the anode of said first tube, a first resistor having one terminal thereof connected to the cathode of said first tube, first summing means to sum the potentials at the second terminals of said first filter and said first resistor to provide a first summed potential, a second filter comprising a second capacitor and a second inductor connected in series, one terminal of said second filter being connected to the cathode of said first tube, second summing means to sum said first summed potential and the potential at the second terminal of said second filter to provide a second summed potential, a third inductor having one terminal thereof connected to the cathode of said first tube, a third capacitor connected between the second terminal of said third inductor and said reference potential, subtracting means to subtract the potential at the second terminal of said third inductor from said second summed potential to provide a difference potential; and means applying said difference potential from the first of said networks to the control grid of said first tube of the second of said networks.

6. The combination in accordance with claim 1 wherein said rejector circuit means comprises first and second networks, each of said networks comprising a first tube having an anode, a cathode and a control grid, a first input terminal connected to the control grid of said first tube, the second input terminal being a reference potential, a second tube having an anode, a cathode and a control grid, a first capacitor and a first inductor connected in series between the anode of said first tube and the control grid of said second tube, a first resistor connected between the cathode of said first tube and the control grid of said second tube, a third tube having an anode, a cathode and a control grid, a fourth tube having an anode, a cathode and a control grid, a second resistor connected between the cathode of said second tube and the control grid of said third tube, a fifth tube having an anode, a cathode and a control grid, a second capacitor and a second inductor connected between the cathode of said first tube and the control grid of said fifth tube, a third resistor connected between the cathode of said fifth tube and the control grid of said third tube, a sixth tube, a fourth resistor and a third inductor connected in series between the cathode of said first tube and the control grid of said sixth tube, a third capacitor connected between the control grid of said sixth tube and said reference potential, a fifth resistor connected between the cathode of said sixth tube and the control grid of said fourth tube, means connecting the cathode of said third tube to the cathode of said fourth tube, a first output terminal, and means connecting the anode of said fourth tube to said first output terminal, the second output terminal being said reference potential; and means connecting the first output terminal of the first of said networks to the first input terminal of the second of said networks.

7. The combination in accordance with claim 6 wherein said third and fifth resistors are variable, and further comprising means to adjust said third resistors in said two networks in unison so that one is increased when the other is decreased, and means to adjust said fifth resistors in said two networks in unison so that one is increased when the other is decreased.

8. The apparatus of claim 1 where said tuning network means comprises a pair of input terminals; first and second circuits each comprising a positive gain amplifier, first and second resistors connected in series to the input of said amplifier, a first capacitor connected to a reference potential on one side and to the junction between said second resistor and said amplifier on the other side, and a capacitor feedback from said amplifier to the junction between said first and second resistors; third, fourth and fifth circuits each comprising a negative gain amplifier, a third resistor and a second capacitor connected in series to the input side of said negative gain amplifier, a fourth resistor connected in series between a reference potential and the junction between said third capacitor and said negative gain amplifier, and a capacitor feedback from said negative gain amplifier to the junction between said third resistor and said second capacitor; said fifth circuit having in addition thereto a fifth resistor on the output side of the negative gain amplifier and a sixth resistor connected in such a manner as to by-pass that portion of the fifth circuit which includes the fifth circuit third resistor on one end and the fifth circuit fifth resistor on the other end; a pair of output terminals; and means connecting said circuits in series between said input and output terminals.

9. The tuning network of claim 8 wherein each of said first; second; third; fourth; and said fifth circuit third, fourth and sixth resistors are adjustable.

10. The tuning network of claim 9 wherein all said adjustable resistors are ganged together so that the resistances thereof can be increased and decreased together.

11. Apparatus of claim 1 wherein said noise rejector circuit means comprises first and second circuits each including first and second input terminals; a first vacuum tube having an anode, cathode, and control grid; means for connecting said first input terminal to said first tube control grid; a second vacuum tube having a cathode, anode, and control grid; a first filter comprising a first capacitor and first inductor connected in series between said first tube anode and said second tube control grid, a first resistor connected between said first tube cathode and said second tube control grid; a third tube having an anode, cathode, and control grid; a second filter comprising a second capacitor and second inductor connected in series between said first tube cathode and said third tube control grid; a fourth tube having an anode, cathode and control grid; a third filter including a resistor and capacitor in series connected between said first tube cathode and said fourth tube control grid; a first means for adding and subtracting signals; second means for connecting said second and third tubes to said first means in such a manner as to add the respective output signals; third means for connecting said fourth tube to said first means in such a manner as to subtract said fourth tube output signal from the second and third tube signals; first and second output terminals connected to said first means; and fourth means for connecting said first and second circuits in series.

12. The apparatus of claim 11 wherein said second and third means for connecting each include a resistor.

13. The apparatus of claim 12 wherein said second and third means for connecting each include an adjustable resistor.

14. The apparatus of claim 13 further comprising means for adjusting in unison said second means in said first and second circuits so that when the resistance of one is increased the resistance of the other is decreased.

15. The apparatus of claim 13 further comprising means for adjusting in unison said third means in said first and second circuits so that when the resistance of one is increased the resistance of the other is decreased.

References Cited in the file of this patent

UNITED STATES PATENTS

| | | |
|---|---|---|
| 2,304,740 | Minton | Dec. 8, 1942 |
| 2,519,890 | Crosby | Aug. 22, 1950 |
| 2,588,291 | Ricker | Mar. 4, 1952 |
| 2,621,290 | Andresen | Dec. 9, 1952 |
| 2,636,119 | Forbes | Apr. 21, 1953 |
| 2,684,468 | McClure | July 20, 1954 |
| 2,709,206 | Ferguson | May 24, 1955 |
| 2,733,412 | Alexander | Jan. 31, 1956 |
| 2,750,499 | Newman et al. | June 12, 1956 |
| 2,783,448 | Piety | Feb. 26, 1957 |
| 2,794,865 | Black et al. | June 4, 1957 |
| 2,826,750 | Grannemann | Mar. 11, 1958 |